United States Patent
Evans

[15] 3,660,703
[45] May 2, 1972

[54] CENTRIFUGAL GOVERNOR SPEED CONTROL FOR ELECTRIC MOTORS

[72] Inventor: Philip Henry Evans, Stourbridge, England

[73] Assignee: Glenburn Engineering Limited, c/o Convers, Dill & Pearman, Bank of Bermuda Bldg., Hamilton, Bermuda

[22] Filed: June 29, 1970

[21] Appl. No.: 50,827

[30] Foreign Application Priority Data

July 4, 1969 Great Britain ..................... 33724/69

[52] U.S. Cl. ................................ 310/68 E, 200/80 R, 310/69, 310/74, 318/325
[51] Int. Cl. ................................................ H02k 11/00
[58] Field of Search ........................... 310/66–69, 74; 200/61.83, 80; 318/325

[56] References Cited

UNITED STATES PATENTS

| | | | |
|---|---|---|---|
| 2,099,050 | 11/1937 | Chamberlain | 310/68 E X |
| 3,304,383 | 2/1967 | Hansen | 318/325 X |
| 2,493,897 | 1/1950 | Petz et al. | 310/68 E X |
| 2,623,962 | 12/1952 | Holstein | 310/68 E X |
| 2,610,314 | 9/1952 | Morse | 310/69 X |
| 2,568,773 | 9/1951 | Sparklin et al. | 310/68 E X |
| 2,903,535 | 9/1959 | Sparklin | 200/80 R |
| 2,623,961 | 12/1952 | Holstein | 310/69 X |
| 2,719,945 | 10/1955 | Tull | 200/80 R X |
| 3,514,649 | 5/1970 | Nomura | 310/74 X |

Primary Examiner—James D. Trammell
Assistant Examiner—Mark O. Budd
Attorney—Merriam, Marshall, Shapiro & Klose

[57] ABSTRACT

The specification discloses a speed control for an electric motor of the type including a centrifugal governor in which the governor comprises a rigid backing plate secured to the armature spindle of the motor and extending radially on opposite sides of the spindle and a flexible strip secured at its ends to the outer end parts of the backing plate and having weighted portions at or close to its extremities and an abutment part at its mid-point which engages means to open and close the contacts to the electric motor. The contacts may comprise a fixed contact and a movable contact, the movable contact being provided on the one arm of a two-armed lever which is pivotally mounted about an axis intermediate the two arms and the fixed contact member being mounted on a further arm pivoted about a further axis and adjustable in position relative to the movable contact by means of a manually operated cam to permit adjustment of the speed of the motor.

10 Claims, 5 Drawing Figures

CENTRIFUGAL GOVERNOR SPEED CONTROL FOR ELECTRIC MOTORS

BACKGROUND OF THE INVENTION

1. Field of the Invention

This invention relates to a speed control means for an electric motor.

The invention particularly relates to a speed control means for an electric motor such as is used in domestic appliances, for example food mixers, where control is provided to vary the motor speed between " slow " and " fast " limits so as to be capable of operating the appliance with the motor running at any speed in between the " slow " and " fast " limits.

The invention is particularly directed to electric motors for food mixers where a speed control is desired in order to be able to operate a food mixer so that for certain jobs the beaters can rotate relatively slowly and for other jobs rotate at faster speeds up to the " fast " limit of the device. Also, different appliances which can be attached to food mixers require to be operated at different speeds and this also adds to the requirement for speed control for the electric motors used in this type of domestic appliance.

The invention is particularly concerned with a speed control means for an electric motor which comprises a governor on the electric motor spindle, which governor operates to open contact means in the electric supply to the motor, there being a " fixed " contact means and a " movable " contact means which is movable relative to the fixed contact means and the governor operates upon the movable contact means. The assembly of fixed and movable contact means can be shifted by a graduated hand control to a desired position in relation to the governor in accordance with the speed required.

In use, the motor speed increases towards its normal maximum running speed until the governor contacts the movable contact means and breaks the circuit to the electric motor. So long as the fixed and movable contact means assembly remains in this position the governor will have the defect of repeatedly making and breaking the circuit to the electric motor so as to keep the motor speed substantially at these desired speeds corresponding to the setting of the hand control which controls the movement of the assembly of movable and fixed contact means relative to the governor.

2. Description of the Prior Art

In this type of speed control means as used hitherto in food mixers the governor has comprised a flexible spring strip secured to a collar on the motor spindle so that the strip extends radially on each side of the motor spindle and secured to each outer end of the strip is a further flexible strip which extends inwardly towards the motor spindle so that these two further flexible strips have their inner ends close to the motor spindle and the two strips being bowed away from the single resilient backing strip. The effect of increase in speed of the motor spindle, due to the centrifugal force acting on the inner ends of the two flexible strips, is to cause these strips to bow forwardly and outwardly away from the flexible backing strip and in so doing move a member mounted slidably upon the motor spindle to bring such member into engagement with the movable contact means and thus initiate the breaking of the circuit to the electric motor.

In practice, such a speed control means has certain disadvantages because it does not enable the motor to operate at relatively low motor spindle speeds, for example below about 4,000 r.p.m., and there is also a limit to the maximum motor speed which can be provided by the speed control means. This arises from the use of a combination of two flexible strips carried by a flexible backing strip because at low speeds the backing strip has too much rigidity and at the higher speeds it has too much flexibility and this limits the maximum and minimum speeds at which the speed control means can operate.

There is therefore a demand for a speed control means particularly for food mixers which will allow the motor to operate at speeds above and below the limits set by the above described and previously used speed control means.

SUMMARY OF THE INVENTION

An object of the invention is to provide a new and improved speed control means whereby the above mentioned disadvantages are overcome or are reduced.

According to the invention, we provide a speed control means for an electric motor comprising a centrifugal governor adapted to be rotated by the electric motor and to open and close electric contacts in the electric circuit to the motor, the governor comprising a spindle adapted to be rotated by the motor, a rigid backing plate fixedly secured to the spindle at the midpoint of the plate and extending radially on opposite sides of the spindle, a flexible strip secured at its ends to the outer end parts of the backing plate and having weighted portions at its extremities and an abutment part at its mid-point, the main length of the flexible strip intermediate its ends being parallel or substantially parallel to the plane of the backing plate in the at-rest position and the abutment part of the flexible strip being adapted to open and close the contacts by flexing of the strip in the direction to move the abutment part away from the backing plate as a result of centrifugal force acting on said weighted portions.

The weighted portions are conveniently formed by forming in the strip, near each of its ends, a loop which projects away from the backing plate.

The contacts may comprise a fixed contact and a movable contact and the movable contact may be provided on one arm of a two-armed member which is pivotally mounted about an axis intermediate the two arms, the other arm being engaged by the abutment portion and the fixed contact member being on a further arm separately pivoted about said axis and said further arm being acted upon by manually operable adjustment means to cause the further arm to move against spring resistance to enable the speed of the motor to be adjusted.

By way of example, one embodiment of the invention will be described hereinafter in detail with reference to the accompanying drawings wherein, FIG. 1 is a side elevation of an electric motor including a speed control means according to the invention, FIG. 2 is a fragmentary underneath plan view of the motor of FIG. 1, FIG. 3 is a cross-sectional view of part of the speed control means of the motor of FIG. 1 shown to an enlarged scale, FIG. 4 is a section on the line 4—4 of FIG. 5, and, FIG. 5 is a front elevation of the motor of FIG. 1 looking in the direction of the arrow A.

DESCRIPTION OF PREFERRED EMBODIMENT

Figure 1:
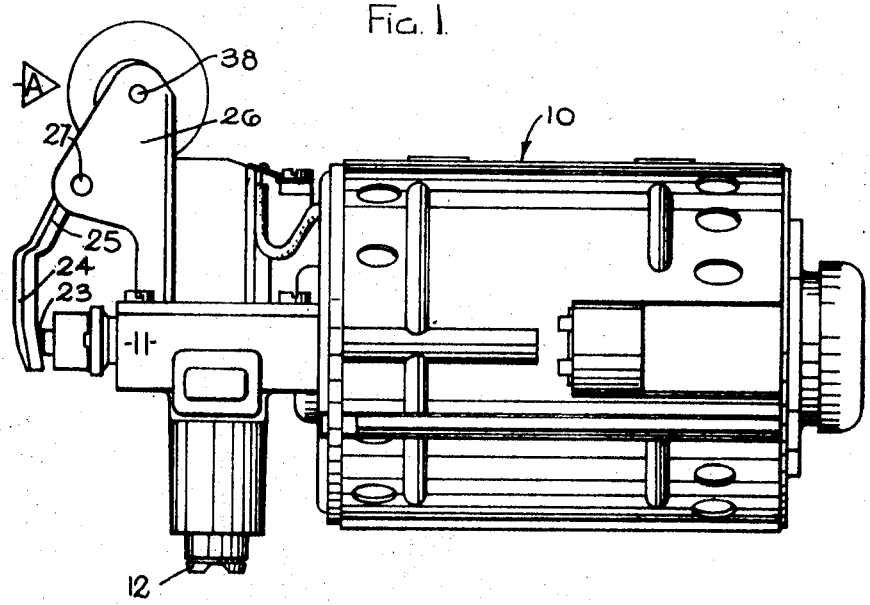

Referring now to the drawings, there is shown an electric motor and part of the drive for the beaters of a food mixer. The motor is indicated generally at 10 and the gear box of the drive is shown at 11 and the drive collets for the beaters are indicated at 12.

Figure 2:
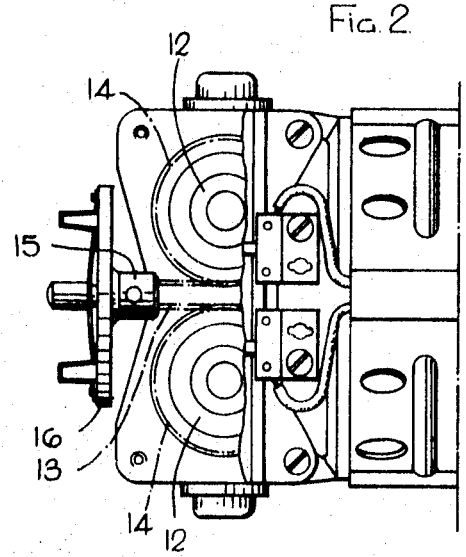

The armature shaft of the motor carries a worm, indicated in chain dotted line at 13 in FIG. 2, which meshes with worm wheels shown in chain dotted line at 14 in FIG. 2 which are connected to the collets 12.

Figure 3:
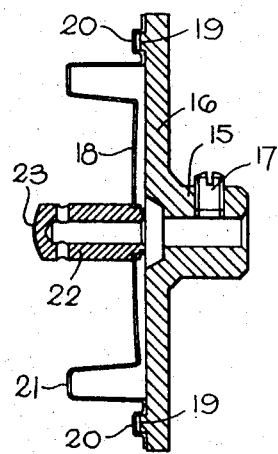

At the outer end thereof the motor armature shaft carries a collar 15 upon which a rigid backing plate 16 is carried. The rigid backing plate 16 extends radially away from the shaft on two diametrically opposite sides thereof. The backing plate 16 is preferably formed integrally with the collar 15 as shown in FIG. 3 and a set screw 17 is provided to secure the collar 15 to the shaft.

A flexible strip 18 is attached at its ends to the ends of the backing plate 16 by providing studs 19 on the backing plate which engage within the recesses 20 formed in the strip 18.

The strip 18 is preferably made from beryllium copper but this is not essential and other material having similar properties may be used. Near each end the strip 18 has a loop 21 formed therein which constitutes a weighted portion to provide the centrifugal force to operate the governor constituted by the strip 18 and backing plate 16 when the shaft of the motor is rotated. Secured to the mid-point of the strip 18 and axially in line with the spindle is a hollow cap member 22 having an end surface 23 which constitutes an abutment portion of the strip 18.

The abutment surface 23, see FIG. 1, is engaged by an end portion of one arm 24 of a two-armed lever 25 which is pivoted to a bracket 26 fixed relative to the motor 10, about an axis 27. The two-armed lever 25 has a second arm 28 which carries a movable contact 29 connected by a wire 30 to a fixed terminal tag 30a on the motor.

The arm 28 is acted upon by a coil tension spring 31 so that the arm 25 is resiliently urged in an anti-clockwise direction about the axis 27, thus maintaining the arm 24 in contact with the surface 23.

Also mounted for rotation on the bracket 26 about the axis 27 is a further arm 32 having a fixed contact 33 mounted thereon and acted upon by a second coil tension spring 34 which also resiliently urges the arm 32 in an anti-clockwise direction about the axis 27.

The arm 32 has a projecting portion 35 which engages a cam 36 connected for rotation to a hand engageable knurled disc 37 mounted for rotation on the bracket 26 about an axis 38.

The contact 33 constitutes the fixed contact and is connected by a wire 39 to a terminal tag 40.

By way of explanation, the fixed contact 33 is termed fixed because at any set position of the speed control this contact remains stationary and it is the movable contact 29 which is actuated by the governor, as hereinafter to be described. It will, of course, be appreciated from the following description that the fixed contact 33 is moved to a desired position by the manual control but in any particular position to which it is so moved it remains stationary for the purposes of speed control, which is why it is referred to herein as a fixed contact in order to distinguish it from the movable contact 29.

Figure 4:
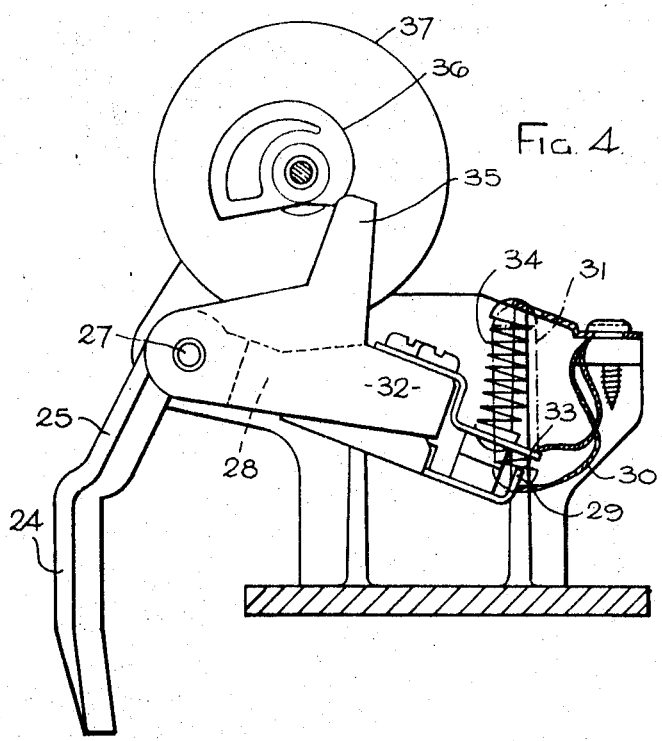
Figure 5:
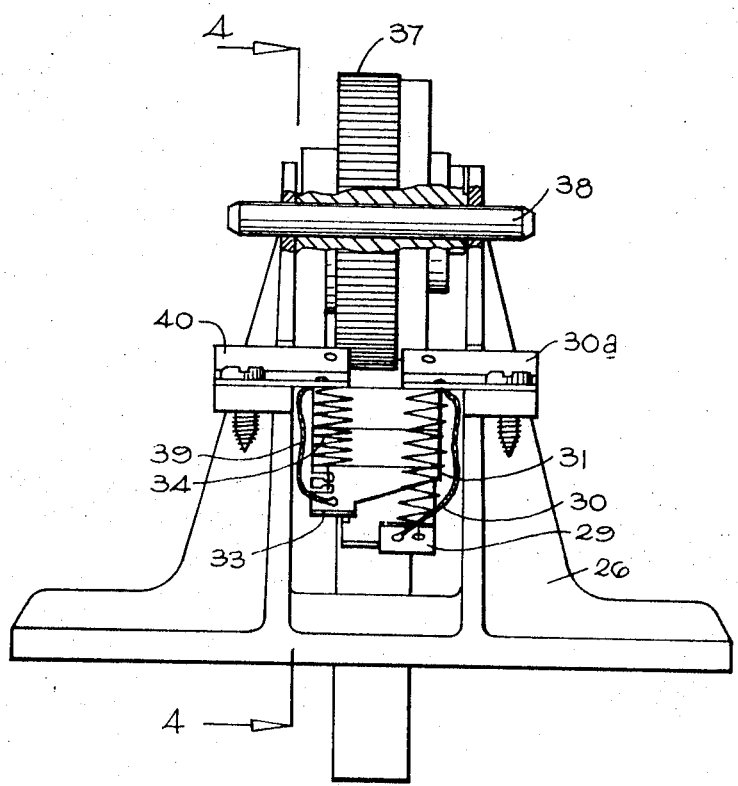

In use, referring now particularly to FIGS. 4 and 5, the hand-engageable disc 37 is rotated so as to cause the cam 36 to move the arm 32 into position to give a desired speed of operation for the motor. The disc 37 is graduated for this purpose.

Rotation of the disc 37 and hence of the cam 36 causes the arm 32 to rotate about the axis 27, rotation of the disc 37 in a clockwise direction in FIG. 4 causing movement of the arm 32 also in a clockwise direction and vice versa.

As the disc 37 is rotated in a clockwise direction in FIG. 4, the arm 32 is also moved clockwise until the contact 33 engages the contact 29 and the motor starts to operate. This position of contact corresponds to the slow speed of operation of the motor. If it is desired that the motor operates at a higher speed, the disc 37 is continued to be rotated until the arm 32 is moved to the necessary position for the desired speed.

As the motor continues to rotate its speed of rotation increases and the centrifugal force acting on the loop 21 causes the strip 18 to bend to move the cam 16 in the direction away from the motor, so causing the surface 23 to move the arm 24, thereby causing the two-armed lever 25 to rotate clockwise about the axis 27, thus moving the movable contact 29 out of engagement with the now fixed contact 33, thereby opening the circuit to the electric motor and causing the electric motor to switch off and hence slow down. As soon as the motor starts to slow down the centrifugal force acting on the loops 21 decreases and so bowing of the strip 18 decreases, thereby enabling the arm 25 to return to its original position under the influence of the coil tension spring 31, thus again closing the contacts 29, 33, and this continuous making and breaking of the circuit continues, thus maintaining the speed of the motor substantially constant.

If it is desired to change the speed of the motor it is only necessary to adjust the disc 37, thus changing the null position of the making and breaking of the contacts 29 and 33.

In practice, it has been found that the use of a rigid backing plate 16 in combination with the single flexible strip 18 forming the governor, enables the speed control to provide for a much wider range of motor spindle speeds than with governors used hitherto, and in particularly it enables the motor spindle to rotate at both higher and lower speeds than has been possible with the arrangements hitherto.

I claim:

1. A speed control means for an electric motor comprising a centrifugal governor adapted to be rotated by the electric motor and to open and to close electric contacts in the electric circuit to the motor, including the improvement wherein the governor comprises a spindle adapted to be rotated by the motor, a rigid backing plate fixedly secured to an end of the spindle at the mid-point of the plate and extending diametrically of the spindle, a single flexible strip fixedly secured at its outer ends to the outer end parts of the backing plate and having weighted portions at the extremities of the strip and positioned inwardly of the position of securement of the strip to the backing plate and an abutment part at the mid-point of the strip, the main length of the flexible strip intermediate its end being substantially parallel to the plane of the backing plate in the at-rest position of the strip and the abutment part of the flexible strip being adapted to open and close the contacts by flexing of the strip respectively in the direction to move the abutment part away from and towards the backing plate as a result of centrifugal force acting on said weighted portions.

2. A speed control means according to Claim 11 wherein the weighted portions are provided by forming the strip, at each of its ends and inwardly of the position of securement of the strip to the backing plate, with a loop which projects in the direction away from the backing plate.

3. A speed control means according to claim 2, wherein the strip is provided with a projecting nose portion extending in the direction away from the backing plate and having a transversely extending end surface which provides the abutment part.

4. A speed control means according to claim 1, wherein the electric contacts comprise a fixed contact and a movable contact, and the movable contact is provided on one arm of a two-armed member which is pivotally mounted about an axis intermediate the two arms, the other arm being engaged by the abutment portion and the fixed contact member being on a further arm separately pivoted about the axis and the further arm being acted upon by manually operable adjustment means to cause the further arm to move against spring resistance to enable the speed of the motor to be adjusted.

5. A speed control means according to claim 3, wherein the electric contacts comprise a fixed contact and a movable contact, and the movable contact is provided on one arm of a two-armed member which is pivotally mounted about an axis intermediate the two arms, the other arm being engaged by the abutment portion and the fixed contact member being on a further arm separately pivoted about the axis and the further arm being acted upon by manually operable adjustment means to cause the further arm to move against spring resistance to enable the speed of the motor to be adjusted.

6. A speed control means according to claim 4, wherein said manually operable adjustment means comprises a manually rotatable cam means acting upon the further arm.

7. A speed control means according to claim 5, wherein said manually operable adjustment means comprises a manually rotatable cam means acting upon the further arm.

8. An electric motor including the improvement comprising a speed control means as claimed in claim 1.

9. An electric motor according to claim 8, wherein the rigid backing plate is mounted on an extension of the armature of the motor.

10. An electric motor including the improvement comprising a speed control means as claimed in claim 5.

* * * * *